United States Patent [19]
Hutchison

[11] Patent Number: 5,199,728
[45] Date of Patent: Apr. 6, 1993

[54] SPACER DEVICE FOR USE IN CONJUNCTION WITH SHOPPING CARTS

[76] Inventor: V. James Hutchison, 1949 S. Robb Way, Lakewood, Colo. 80228

[21] Appl. No.: 680,097

[22] Filed: Apr. 3, 1991

[51] Int. Cl.$^5$ .............................................. B62B 11/00
[52] U.S. Cl. ............................................. 280/33.992
[58] Field of Search ................. 280/33.992, 33.991, 280/33.997, 62

[56] References Cited

U.S. PATENT DOCUMENTS

| | | | |
|---|---|---|---|
| 2,935,330 | 5/1960 | Millman | 280/33.992 |
| 3,813,111 | 5/1974 | Ruger | 280/33.991 |
| 4,593,922 | 6/1986 | Upshaw et al. | 280/33.992 |
| 4,600,204 | 7/1986 | Badger | 280/33.992 |
| 4,805,935 | 2/1989 | Grayson | 280/33.992 |

FOREIGN PATENT DOCUMENTS

| | | | |
|---|---|---|---|
| 3128067 | 2/1983 | Fed. Rep. of Germany | 280/33.991 |
| 3235803 | 3/1984 | Fed. Rep. of Germany | 280/33.992 |

OTHER PUBLICATIONS

Standard Handbook for Mechanical Engineers, Seventh Edition, McGraw-Hill Book Company, pp. 6-192, 6-193.

*Primary Examiner*—David M. Mitchell
*Attorney, Agent, or Firm*—Timothy J. Martin; Dana S. Rewoldt

[57] ABSTRACT

A spacer device for shopping carts mounts on the wheeled frame of a cart in order to prevent lateral binding of the frames of a pair consecutively nested shopping carts. The spacer has a central body portion that is secured alongside a frame portion of a first one of the pair of shopping carts by a mounting structure so that when the carts are nested, the central body is interposed between the frame portions of the two carts thereby preventing direct contact and, thus, binding. The central body has an exposed glide surface formed of a low friction material so that the frame portion of the second cart slideably contacts the glide surface for lateral sliding movement. The mounting structure may be C-shaped resilient clips that snap fit onto circular frame portions.

18 Claims, 4 Drawing Sheets

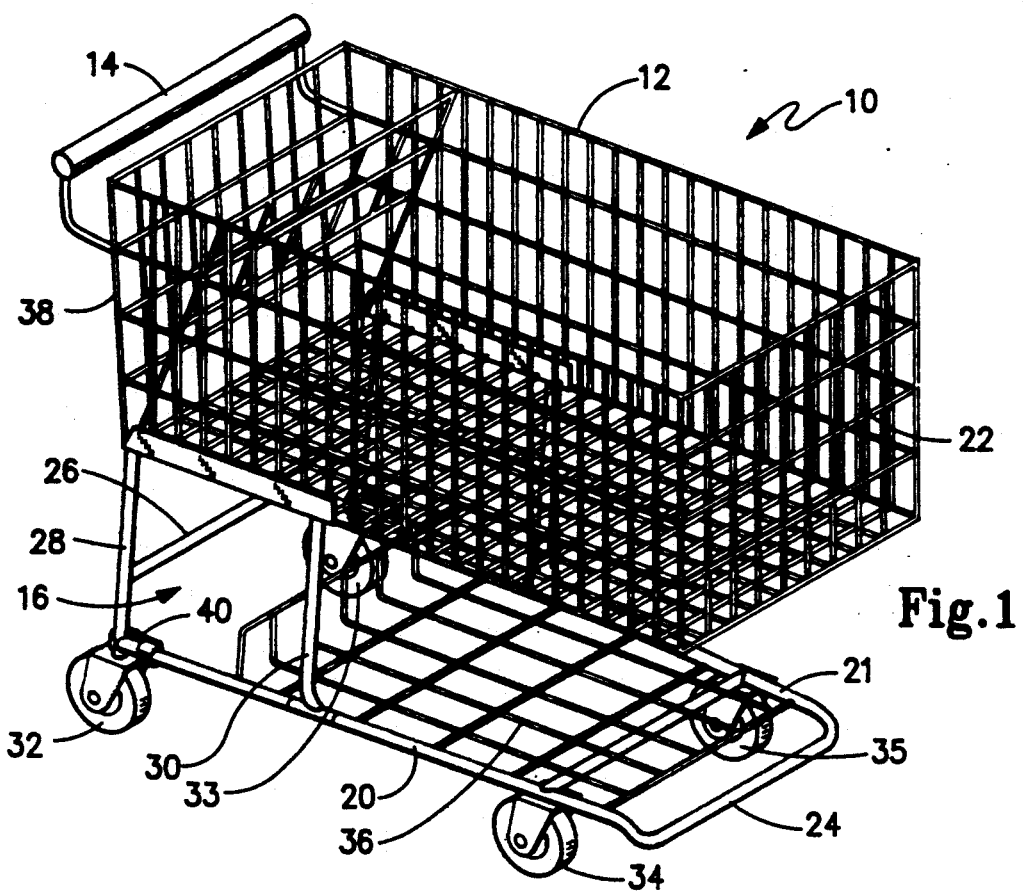
Fig.1
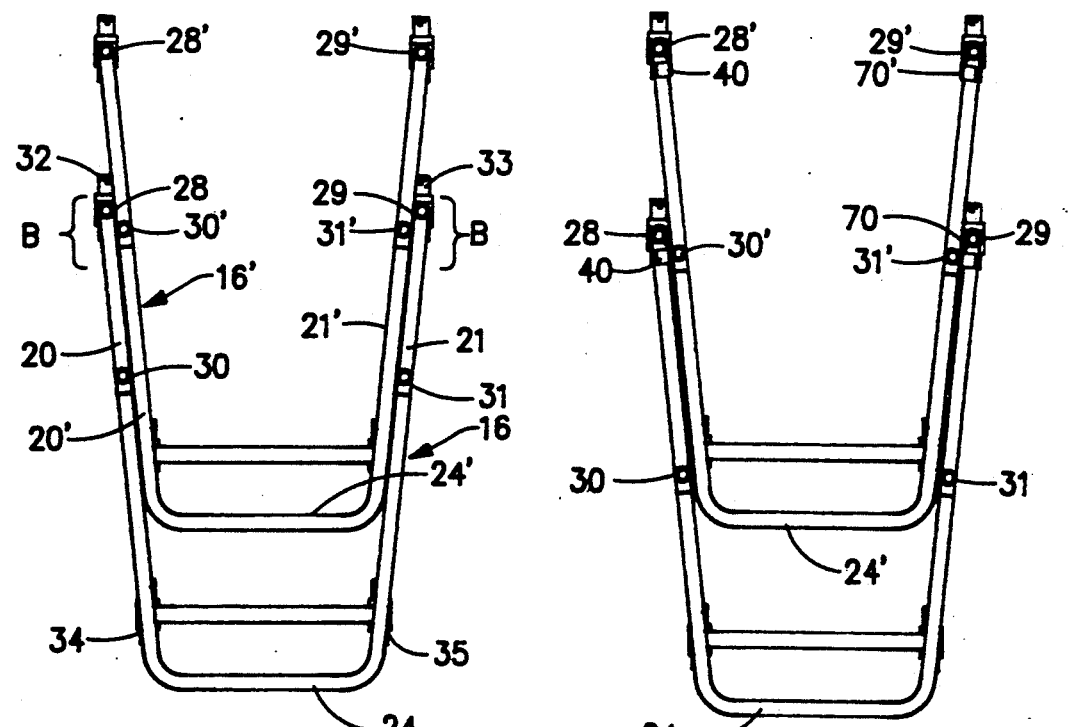
Fig.2 (PRIOR ART)
Fig.3

SPACER DEVICE FOR USE IN CONJUNCTION WITH SHOPPING CARTS

FIELD OF INVENTION

The present invention broadly relates to anti-friction elements, but more specifically relates to an anti-friction spacer device for use with shopping carts. In particular, the present invention concerns a specially constructed retro-fit spacer device which may be used on existing shopping carts to prevent unwanted binding when the carts are nested with one another.

BACKGROUND OF THE INVENTION

Present day shopping often involves the use of carts which allow shoppers to select various merchandise and conveniently transport the merchandise from their respective display locations to a check-out or payment counter. The advent of the shopping cart apparently resulted from increased centralization of merchandise into larger, more diversified retail outlets. For example, neighborhood food markets were supplanted by larger centralized grocery stores which typically were able to offer a larger variety of food items at reduced costs due to volume of sales. Likewise, neighborhood stores, such as general merchandise stores and the like, have been eliminated by competition from large, general merchandise department stores and shopping malls. Recently, a new wave of competition to existing retail outlets has been developed in the form of warehouse-like "mega stores" wherein virtually all of a consumers merchandise needs may be found under a single roof.

The reason that the development and increased use in shopping carts resulted from this competitive structure is that consumers desired to sacrifice the convenience of small local stores for the reduced prices offered by larger, centralized retail outlets. A natural circumstance of this development is that consumers now find themselves more distant from the centralized retail outlet. Accordingly, consumers have changed their shopping pattern from one in which a few items were purchased, almost daily, from local stores to pattern where a consumer purchases an inventory of supplies on a periodic (e.g. weekly or bi-weekly) basis. Since a consumer purchases an inventory of supplies, often at a single store, it has become virtually impossible for the consumer to carry all of the selected goods in his/her arms or in hand-held baskets during the shopping excursion. Therefore, the management of centralized retail outlets have found it necessary and profitable to supply shoppers with transportable shopping carts which can conveniently hold a large volume of goods that are selected during the shopping excursion and which goods may then be transported to a payment counter for a single purchasing transaction.

Shopping carts in common use have some minor differences in appearance and construction, but they are found to have a fairly standard structure. The standard shopping cart includes a large plastic or wire basket which is supported on a wheeled frame typically manufactured from tubular metal elements. More specifically, the wheeled frame usually has a lower, horizontal frame portion which is U-shaped in appearance with forwardly convergent side rails which are joined at the front region by a downwardly turned lip. The side rails supports upright tubular members which, in turn, position the basket in spaced-apart, parallel relation to the horizontal lower framework. A handle is connected to the upper rear portion of the basket, and the basket extends forwardly and converges inwardly to terminate in a nose portion. An auxillary merchandise support, in the form of a wire platform, is often provided on the lower horizontal framework.

When these shopping carts are not in use, store managers find it desirable to store the array of carts in a minimum space; therefore, these shopping carts are constructed so that they may be nested together. Here, adjacent ones of the carts form mated pairs defined by an inner cart and an outer cart. More specifically, when in the nested state, the basket of the inner cart is telescopically received in to the interior of the basket of the outer cart while the lower framework of the inner cart slides interiorly alongside the lower framework of the outer cart. It is for this reason that both the basket and the lower framework of each cart is forwardly convergent from the rear or handle portion. Further, to allow this nesting, the back section of each basket is hinged at an upper portion thereby allowing the back section of the outer basket to be elevated by the nose of the inner basket as it is moved toward the nested state so that the back section rides up and over the basket of the inner cart. Likewise, the auxiliary wire platform is hinged forwardly of the lower horizontal framework so that it may ride up and over both the downwardly turned lip of the lower framework and the auxillary wire platform of the inner cart as the inner cart is advanced into the nested state.

One problem resulting from this standard structure and nesting procedure is widely recognized by both shoppers and merchants, alike. This problem concerns the tendency of a mated pair of shopping carts to bind with one another so that it becomes difficult for a shopper or store employee to separate an outer cart from an inner cart. As disclosed in this application, the binding typically occurs not between the baskets or upright frame pieces, but rather, this binding occurs as a result of longitudinal abrasion between the side rails of the lower horizontal frameworks. Even where the side rails are additionally manufactured as smooth tubular pieces, repetitive frictional contact between the side rails of the inner and outer carts during nesting and unnesting causes a roughing which increasingly deteriorates the sliding surfaces. Also, environmental conditions can deteriorate the contacting side rail surfaces. Eventually, the abrasion and deterioration may become sufficiently severe so that the side rails tend to frictionally lock against one another, i.e., bind together, when the shopping carts are in the nested state. This problem may be further exacerbated where the carts are at a cold temperature when nested but are then moved to a warmer environment, such as the interior of the store since any thermal expansion may act to tighten the frictional fit of a mated pair of carts.

Despite the widespread recognition of this binding problem in an array of nested shopping carts, the present inventor knows of no commercially available solution to this problem either provided as a original piece of manufactured equipment or as a retro-fit device. Accordingly, there has been a long felt need for a solution to this problem. Further, since there are literally millions of shopping carts in use, there is a need for a simple retro-fit device which may be mounted on common shopping carts to help alleviate this problem.

SUMMARY OF THE INVENTION

It is an object of present invention to provide a new and useful product, in the form of a spacer device, which reduces binding between adjacent shopping carts in a nested array.

Another object of the present invention is to provide a simple and inexpensive spacer device which can be configured to fit on existing shopping carts as a retro-fit solution to the problem of binding which often occurs between a mater pair of shopping carts.

It is a further object of the present invention to provide a snap-on spacer device which can be readily attached to a wide variety of existing shopping carts to prevent the shopping carts from becoming frictionally bound together when nested and which spacer device does not readily become dislodged.

Yet another object of the present invention is to provide a spacer device integrally molded of a low friction, high durability plastic so as to provide a glide surface between the side rails of adjacent shopping carts when shopping carts are nested together.

It is still a further object of the present invention to provide a spacer device which may be retro-fitted onto a variety of standard shopping carts to prevent their binding together when nested and which spacer device is resistive to deterioration from environmental conditions.

According to the present invention, then, a spacer device is broadly disclosed which is to be used in conjunction with shipping carts of common manufacture. This spacer device is therefor adapted to be mounted on a shopping cart in order to prevent binding when the shopping cart is nested with another shopping cart as a mated pair comprising an inner cart and an outer cart. The spacer device broadly comprises a central body portion which is adapted to be secured alongside a frame portion of a first one of the mater pair of shopping carts at a selected location so that the central body portion is interposed between frame portions of the mated pair of carts when in the nested state. The central body portion prevents direct contact of the frame portions of the mated pair of carts and provides an exposed glide surface formed of a low friction material. The glide surface is oriented such that the frame portion of a second one of the mater pair slideably contacts the glide surface at the otherwise normal point of binding for sliding movement therealong as the mater pair move into and out of the nested state. Suitable mounts are provided to secure and retain the central body portion at the selected location.

Preferably, as special mounting structure is used as described in reference to the preferred embodiment of the invention. Here, the mounting structure is configured so that the central body portion is secured to the outer cart with the glide surface being interiorly exposed so as to face and contact the frame portion of the inner cart in the nested state. This glide surface may be substantially planer and, in a preferred embodiment of the present invention, the central body portion and corresponding glide surface are dog-legged in configuration so that a rear portion of the central body is off-set from a front portion thereof. A mounting means may be clip-like structures formed by arcuate jaws adapted to snap-fit around the frame forming elements of the framework structure and, where the frame forming pieces are tubular members, the clip may be C-shaped structure formed between a pair of arcuate jaws. Accordingly, the spacer device is preferably formed of a highly durable, low friction plastic material that has some limited resiliency so that the securely snap-fit on the framework without fear of unintended dislodgment.

In the preferred exemplary embodiment, the spacer device includes a rearwardly extending, arcuate wing which forms a cylindrical opening adapted to receive an upright support member while the second mount includes a pair of arcuate jaws which define a cylindrical opening adapted to receive a side rail. The axes of the cylindrical openings of the first and second clips are oriented with respect to one another at an angle that this therefore similar to the angle of orientation of the side rail and its respective upright support member.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 1 is a perspective view of a shopping cart showing a spacer device according to the first exemplary embodiment of the present invention attached to a side rail and vertical support of the framework thereof;

FIG. 2 is a top plan.view of the lower support framework of a pair of prior art shopping carts, such as the shopping cart of FIG. 1, without the spacer device of the present invention and showing the lower frameworks in nested state;

FIG. 3 is a top plan view, similar to FIG. 2, showing the mater pair of lower framework assemblies having attached thereto a pair of spacer devices according to the first exemplary and preferred embodiment of the present invention;

DETAILED DESCRIPTION OF THE EXEMPLARY EMBODIMENTS

Figures 4A, 4B:
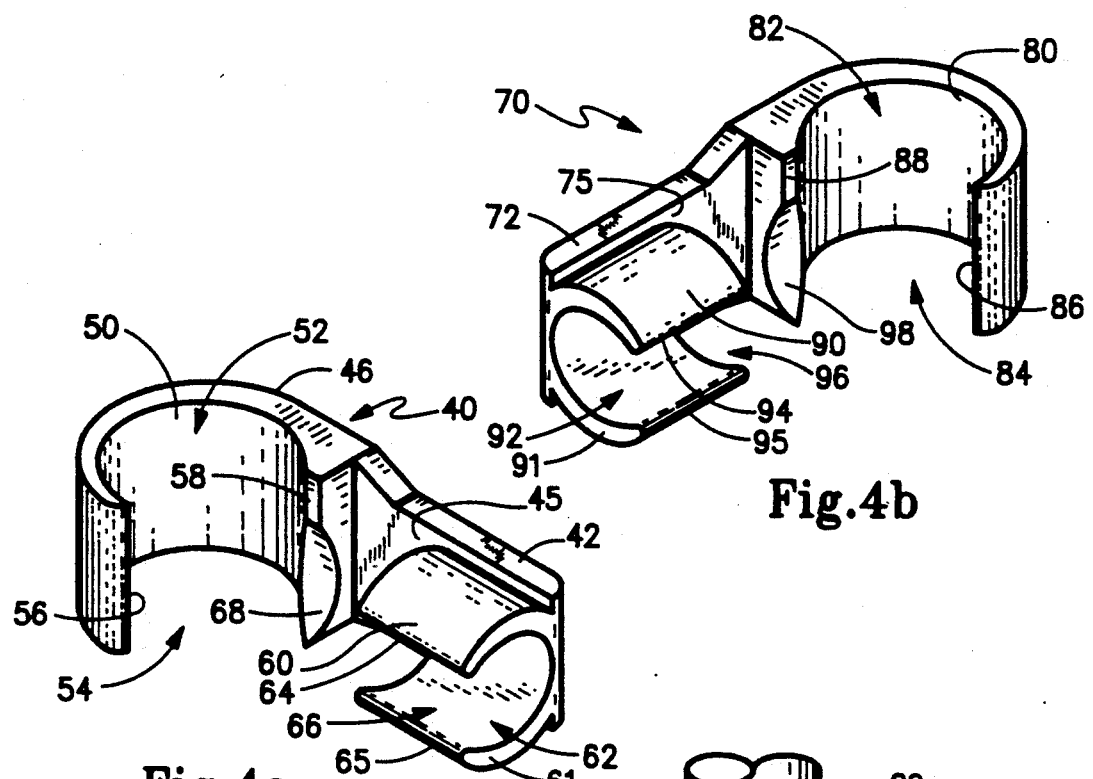
FIGS. 4(a) and 4(b) are perspective views showing, respectively, the right and left spacer devices according to the first exemplary embodiment of the present invention.

The present invention concerns a device constructed to eliminate binding when shopping carts are nested together in a nested array. In its broad form, the spacer device includes a central body which is attached to framework elements of the shopping cart which framework elements normally support a basket and provide a wheeled frame for the shopping basket. The central body is secured to the framework elements by appropriate mounting means, and the central body provides a glide surface so that when a mated pair of shopping carts are nested together, the central body is disposed between the framework elements which would ordinarily contact one another and eventually bind due to abrasion or deterioration resulting from exposure to the environment. It should be clearly understood that the present invention provides exemplary embodiments of the spacer device but that the construction of these spacer devices may take different forms without department from the board teachings of this invention, as would be apparent to the ordinarily skilled person having had the opportunity to read this disclosure. However, it should also be understood that this invention includes a specific mounting construction in combination with the broad concept of the invention.

As is shown, then, in FIGS. 1 and 2, a standard shopping cart 10 includes a basket 12 having a handle bar 14 located rearwardly thereof. Basket 12 is supported by means of a wheeled framework 16. When viewed in a forward direction from handle bar 14, framework 16 which, includes a right side rail 20, a left side rail 21, a forwardly positioned downwardly turned lip 24, a rear cross bar 26, right and left rear upright members 28, 29 and right and left intermediate upright members 30, 31. Framework 16 may be supported on a convenient support surface by means of rear wheel assemblies 32 and 33 and front wheel assemblies 34 and 35. A lower auxillary shelf 36 in the form of a wire platform is hinged to framework 16 at a forward portion thereof.

Basket 12 is forwardly convergent so that a rear section 38 which is hinged proximate handle bar 14 tapers inwardly and forwardly of handlebar 14 to terminate in a front section or nose 22. Likewise, side rails 20 and 21 of framework 16 taper together in a forward direction. With this construction, as is well-known in the art, a pair of shopping carts may be nested together as a mated pair wherein one shopping cart forms an outer cart which telescopically receives an inner cart. Naturally, nested array of shopping carts may include an undefined number of adjacent mated pairs, so nested with one another. To this end, when in a nested state, the basket 12 of the inner crt is advanced into the basket of the outer cart by pressing the nose 22 of the inner cart against the rear section 38 of the outer cart so that it pivots upwardly to accommodate advancement of one basket into the other. Simultaneously, lower shelf 36 of the outer cart pivots upwardly to accommodate both the lower shelf of the inner cart as well as the inner cart's framework assembly 16.

FIG. 2 shows the lower framework assembly of a mater pair of shopping carts according to the prior art without the benefit of the present invention. In this figure, it may be seen that outer framework 16 and inner framework 16' mate with one another in a nested state. Here, it may be seen that right side rail 20 of the outer cart is positioned alongside right side rail 20' of the inner cart. Likewise, left side rail 21 of the outer cart is located alongside left side rail 21' of the inner cart. It has been found that, when nested, the inner and outer carts may tend to bind together in the regions "B" shown in FIG. 2 which is that region generally described as the portion of the side rails about rear upright members 28,29 of the outer cart and about intermediate upright members 30',31' of the inner cart. Thus, it should be fully appreciated that the binding of a mated pair of shopping carts occurs not as a result of the telescopic engagement of the respective baskets but rather the press-fit of framework portions, usually of the lower framework assembly.

According to the present invention it has been found that substantially all binding between a mated pair of shopping carts may be eliminated by providing a spacer device, formed of a high durability, low friction plastic material, such as acetal or nylon. A spacer device of these plastics provides a glide surface at the normal contact locations. However, other materials may be suitable in manufacture. Thus, as is shown in FIGS. 1 and 3, a right spacer device 40 and left spacer device 70 are respectively provided for the right and left upright supports 28,29. Thus, as is shown in FIG. 3, the outer cart of a mated pair includes right spacer device 40 and left spacer device 70 while the inner cart includes right spacer device 40' and left spacer device 70' respectively adjacent upright supports 28' and 29'.

Figures 5A, 5B:
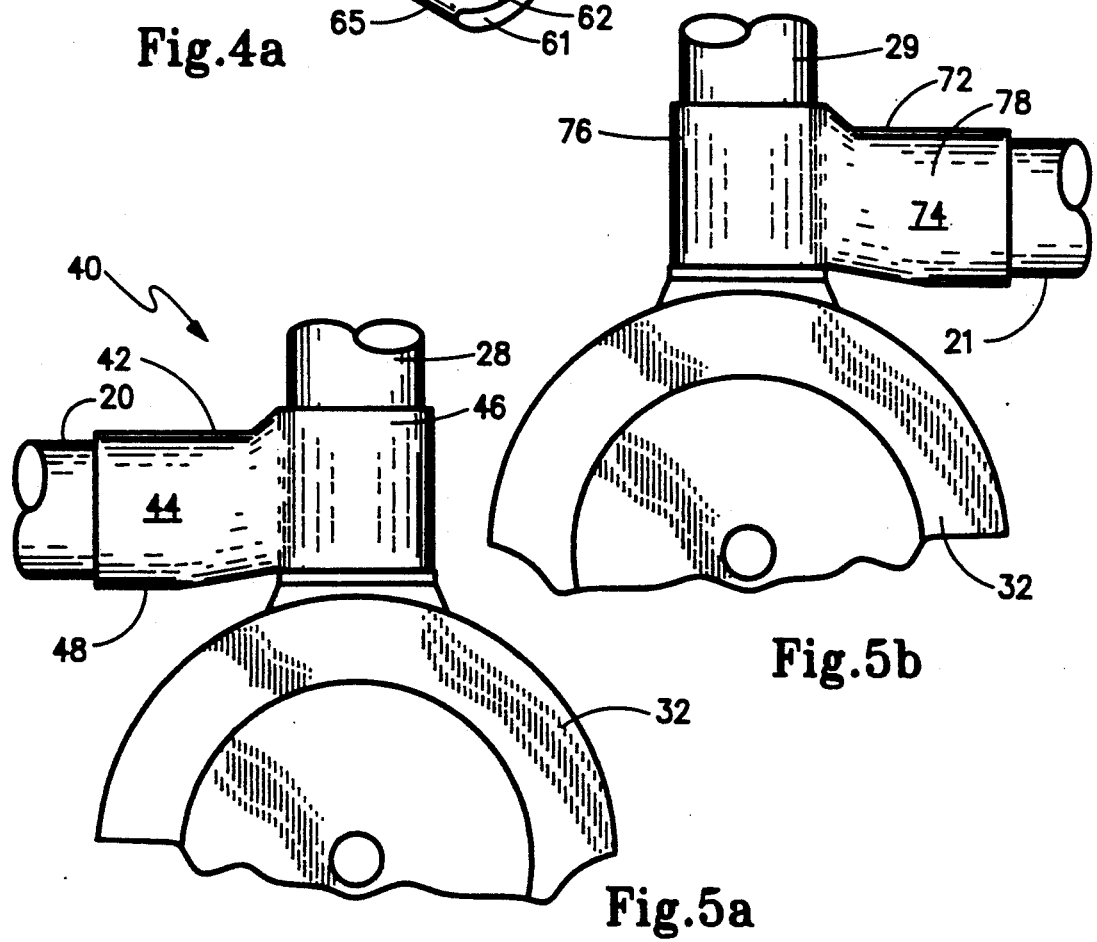
FIGS. 5(a) and 5(b) are side views in elevation showing, respectively, the spacer device of FIGS. 4(a) and 4(i b) with the spacer devices being mounted on lower framework pieces of a shopping cart.

The structure and mounting of spacer devices 40 and 70 are best shown in FIGS. 4(a), 4(b), 5(a) and 5(b). With reference to FIGS. 4(a) and 5(a), it may be seen that right spacer device 40 includes a central body portion 42 preferably formed as a dog-legged shaped plate formed of a rear section 46 and a front section 48 which are off-set with respect to one another. Central body portion 42 provides a glide surface 44 which operates to prevent binding, as more thoroughly described below.

In order to securely mount right spacer device 40 to framework 16, a first mounting means in the form of a curved wing 50 is molded as an arcuate extension of rear section 46 of central portion 42. Curved wing 50 has a radius of curvature which is similar to the radius of curvature of the outer circumference of tubular rear upright support member 28 so that it has a cylindrical interior 52 sized to snap-fit around upright support member 28. To this end, an opening 54 is provided between distal edge 56 of curved wing 50 and ridge 58 formed on the inner surface 45 of central body portion 42 opposite glide surface 44.

A second mounting means in the form of a pair of arcuate jaws 60 and 61 project from surface 45 at front section 48 of central body 42 to terminate, respectively, in distal edges 64 and 65 which are spaced apart from one another to define a cylindrical interior 62 having an opening 66 between jaws 60,61. Jaws 60,61 are located on a common side of central body 42 as is curved wing 50 and are formed to have a radius of curvature that is similar to the radius of curvature of the circumferential surface of right side rail 20 of lower frame work assembly 18. Ridge 58 is provided with a suitable scallop recess 68 likewise formed with a radius of curvature similar to the circumference of side rail 20. With reference again to FIG. 5(a), it may now be appreciated that, due to the dog-legged construction of central body portion 42, the first and second mounting means are off-set with respect to one another. Further, with this construction, the central apes of cylindrical interiors 52 and 62 are orient at a angle corresponding to the angular orientation of rear upright support member 28 and side rail 20.

The construction of left spacer device 70 is shown in FIGS. 4(b) and 5(b), and it may readily be seen by comparing FIGS. 4(a) and 4(b) that left spacer device 70 is a mirror image of right spacer device 40. Thus, left spacer device 70 has a central body portion 72 formed of rear section 76 and a front section 78 that are off-set from one another so that central body 72 is in the form of a dog-legged shaped plate. A first mounting means in the form of a curved wing 80 is provided as an extension of rear section 76 and has a cylindrical interior 82 formed at a common radius of curvature as left rear upright member 29. Opening 84 is provided to this interior with opening 84 being formed between distal edge 86 of wing 80 and ridge 88 formed on inner surface 75 opposite glide surface 74. A second mounting means is formed by a pair of arcuate jaws 90, 91 which respectively terminate in distal edges 94,95 which are spaced-apart to define an opening 96 between jaws 90 and 91. Jaws 90,91 have a cylindrical interior 92 having radius of curvature that is similar to the radius of curvature of the circumference of left side rail 21. Again the axes of cylindrical interiors 82 and 92 match the angular orientation of support member 29 and side rail 21.

Figure 6:
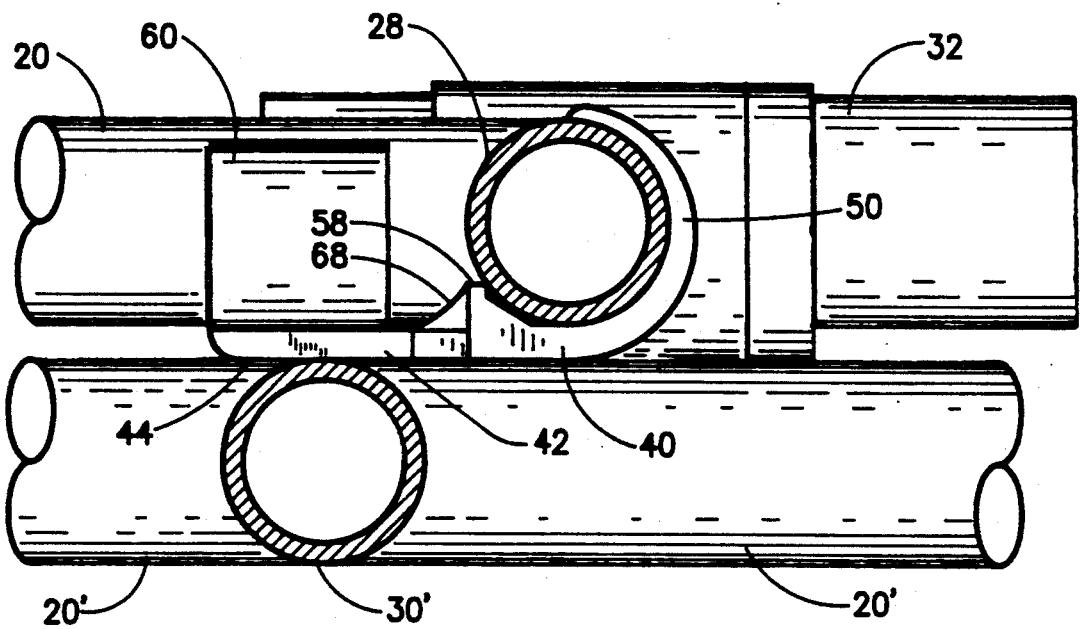
FIG. 6 is a top plan view showing the spacer devices of FIGS. 4(a) and 5(a) attached to an upright support and a side rail of an outer cart and showing the right side rail of an inner cart nested therewith.

The mounting of the spacer devices according to the first exemplary embodiment of the present invention may now be more fully appreciated with reference to FIG. 6. Since the structure and mounting of left spacer device 70 is substantially identical to the mounting of right spacer device 40, only the mounting and structural functioning of right spacer device 40 is described below. Accordingly, it may be appreciated with reference to FIG. 6, right spacer device 40 is mounted by first snap-fitting curved wing 50 around right rear upright support 28. Spacer device 40 may be rotated and positioned so that right side rail 20 is adjacent opening 66 between jaws 60,61 and right spacer device 40 may then be rotated to snap-fit into interior 62 of jaws 60,61 around right side rail 20 as shown in the mounted position in FIG. 6. To this end, it should be appreciated that right spacer device 40 (and likewise left spacer device 70) is preferably formed of an integral piece of injection molded plastic material having relatively low friction and high durability. Examples of such plastic may include, but are not limited to, acetal and nylon. This integral injection molded structure allows for extremely low cost in manufacture. The preferred plastic for this manufacture is acetal due to its lubricity, low co-efficient of friction and its durability. Nylon is less desirable due to its tendency to absorb moisture. Ultraviolet inhibitors may be included in the plastic if desired.

As is shown in FIG. 6, when spacer device 40 is in the mounted state, interior surface 45 abuts side rail 20, and side rail 20 is further supported by recess 68 of rib 58. Glide surface 44 is normally exposed to the interior of framework 16. However, when a mated pair of carts are nested with one another, a portion of the right side rail 20' (of the inner cart) that is adjacent upright intermediate support 30' is oriented alongside the portion of side rail 20 adjacent rear upright support members 28. Contact is made, however, with glide surface 44. The spacing of side rails 20 and 20' apart from one another, due to the thickness of central body portion 42, as well as the low friction glide surface 44, prevents the binding which could ordinarily occur without the spacer devices. Due to the plastic construction of the spacer devices 40,70 they are both durable and highly resistant to degradation from environmental conditions, for example, sun, rain, salt, and the like. Further, since the tubular steel construction of the framework forming pieces, any abrasion or damage which occurs during the nesting and unnesting of the carts will in all probability, occur to the spacer devices and not to the framework elements. Thus, should damage occur it is a simple matter of replacing the inexpensive plastic spacer device rather than the expensive framework elements.

The above-described preferred construction has several advantages. First, due to the stiffeners (yet slight resiliently) of acetal plastic, the spacer devices 40 and 70 may be snap-fit onto framework 16. Once in place, the spacer devices resist inadvertent dislodgment, and this advantage is increased by disposing central body portions 42 and 72 interiorly of framework 16 so that accidental contacts with the spacer devices may be minimized. At the same time, repair persons using normal tools have no difficulty in removing the spacer devices for replacement and maintenance. Furthermore, this structure, once mounted, is snap-locked against any rotational or other travel on framework 16 so that it cannot creep out of position. All of this is accomplished without any special assembly or modification of the shopping cart.

Figure 7:
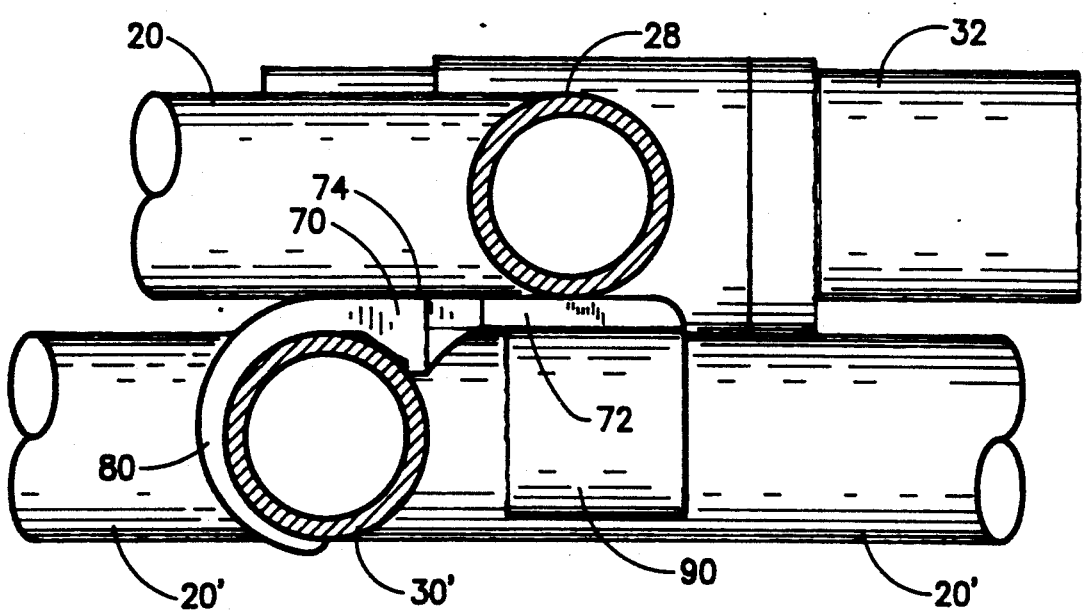
FIG. 7 shows a first alternate embodiment of a spacer device according to a second exemplary embodiment of the present invention.

It should be understood that other structures of spacer devices are within the broad scope of the present invention as are alternative positioning and mounting means. One such alternate mounting is shown in FIG. 7 where it may be appreciated that, with respect to a mated pair of shopping carts is concerned, it is only important that the central body portion be interposed between the adjacent side rails to space the framework portions and provide a glide surface therefor. While the mounting shown in FIG. 6, wherein the central body is disposed interiorly of the associated lower framework assembly, it is also quite possible to mount the spacer devices so that the central body is exteriorly exposed. This is less desirable since it increases the risk that the spacer devices be dislodged upon impact with curbs, posts and the like. But, this alternate mounting is nonetheless acceptable within the general context of the present invention.

Accordingly, as is shown in FIG. 7, it is possible to mount a spacer block, such as left spacer block 70 on the right side of the framework assembly. Here, it may be seen that the first mounting means in the form of curved wing 80 is snap-fit around right intermediate upright support member 30' with the second mounting means in the form of jaws 90 and 91 snap-fit around a portion of right side rail 20'. This positions central body 72 so that it is exteriorly disposed of the interior frame work 16' containing right side rail 20'. In this embodiment, glide surface 74 is outwardly disposed so that, when the outer cart is nested with the inner cart, outer right side rail 20 is oriented alongside inner side rail 20' but is spaced therefrom by the thickness of central body 72 and is prevented from binding by glide surface 74. Should the intermediate upright support posts be oriented at different locations so that the right and left spacer devices do not provide suitable mounting means, it should be recognized by the ordinarily skilled person that alternate mounting means maybe required to suitably orient and secure the central body portion containing the necessary glide surface.

Figure 8:
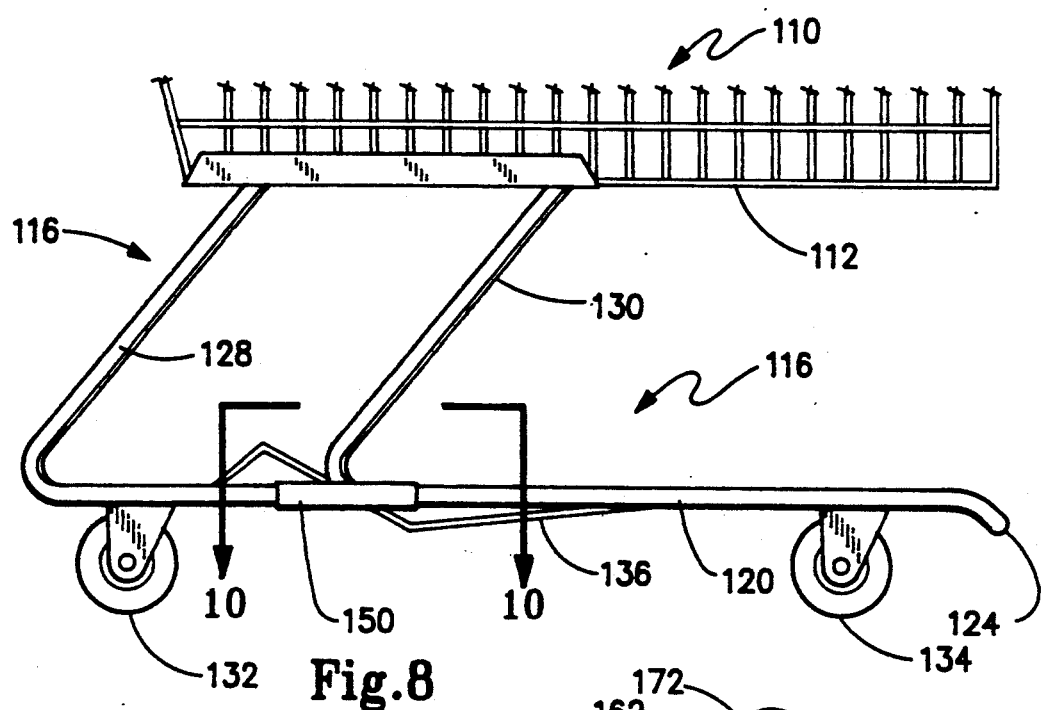
FIG. 8 is a side view in elevation showing an alternate shopping cart construction and a second alternate exemplary embodiment of the present invention used therewith.
Figure 9:
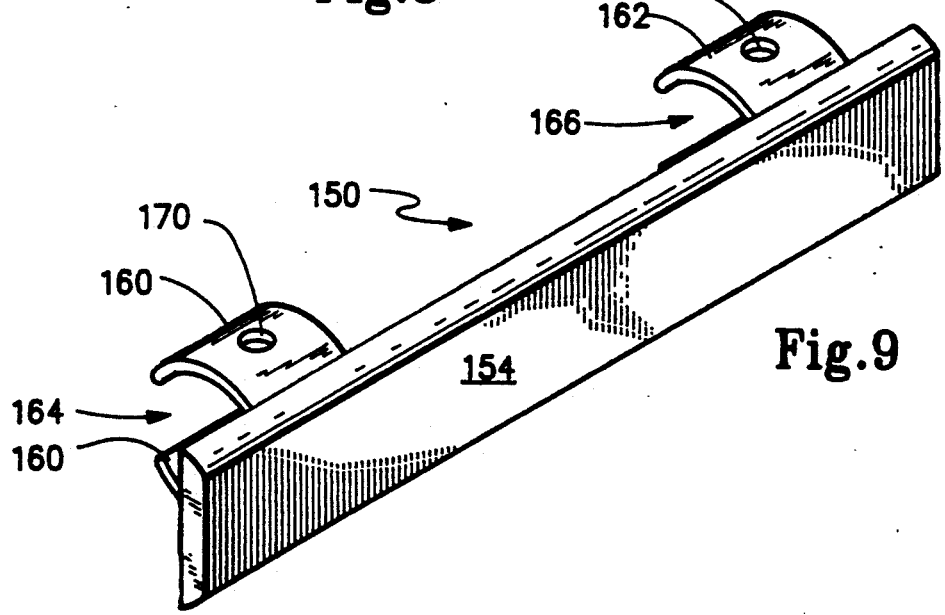
FIG. 9 is a perspective view of the spacer device shown in FIG. 8.
Figure 10:
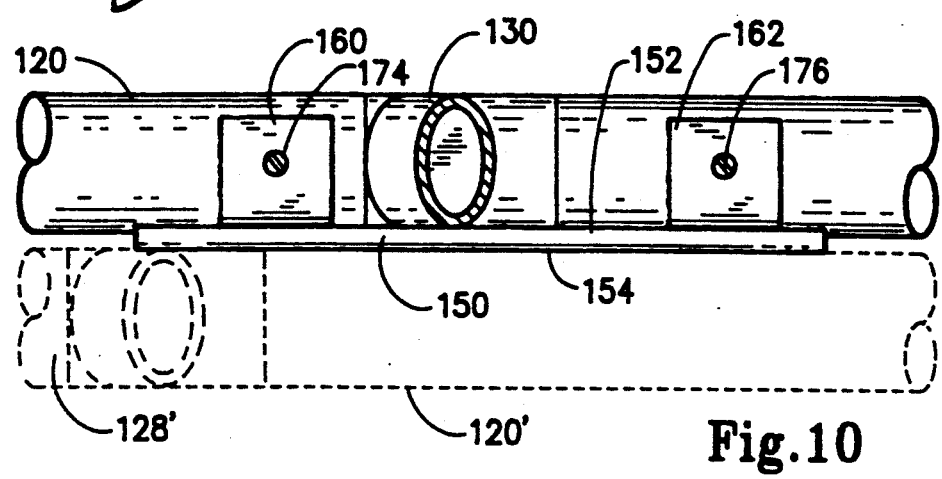
FIG. 10 is a cross-sectional view taken about lines 10—10 of FIG. 8 showing the spacer device of FIG. 9 and showing in phantom the contact therewith by an outer cart side rail.

Thus, another exemplary example is shown in FIGS. 8-10. Here, a modified spacer device structure is shown which is mountable on a framework portion of either the left or right side rails, and may be mounted so that its glide surface is either interiorly or exteriorly exposed. In these Figures an alternate shopping cart 110 has a basket 112 supported by a framework assembly 116 and includes a framework portion 116 having side rails, such as right rail 120, rear upright supports 128 and intermediate upright supports 130. Rear wheel assemblies 132 and front wheel 134 assemblies are provided and an auxillary wire platform 136 is pivotally attached adjacent forwardly and downwardly turned lip 124 of lower frame work assembly 116.

As is further shown in these figures, a spacer block 150 is shown attached to a central portion of side rail 120 by first and second mounting means in the form of a first pair of jaws 160 and a second pair of jaws 162. Jaws 160 are arcuate in shape and have a radius of curvature that is similar to the circumference of side rail 120 so as to define a cylindrical opening 164 that allows jaws 160 to be snap-fit therearound. Likewise, arcuate jaws 162 have a similar radius of curvature as the circumference of side rail 120 and define a cylindrical opening 166 that may receive side rail 120 in snap-fitted engagement. In order to keep slide device 150 from rotating about the longitudinal axis of side rail 120, an upper jaw 160 may be provided with a hole 170 while jaws 162 may be provided with holes, such as holes 172. When mounted, as shown in FIG. 10, screws 174 and 176 maybe respectively tapped into side rail 120 through holes 170 and 172. Also, as is shown in phantom in this figure, side rail 120' is oriented alongside side rail 120 with upright support 128' being located proximate intermediate upright support 130 in the nested state. Side rails 120 and 120' are separated by the thickness of central body 152 with side rail 120' abutting glide surface 154 for a slideable movement therealong.

From the foregoing, it should now be understood that various configured spacer device may be designed and manufactured according to the teachings of the present invention as would be necessary for the various types of shopping carts in common use. These spacer devices may readily be retro-fit moldings that may be conveniently mounted on existing shopping carts without any structural modifications whatsoever. Alternately, of course, the spacer devices providing the necessary guide surfaces could be manufactured as part of the original equipment of a shopping cart so that these spacer devices may be either part of the original structure or, as noted, retro-fit items.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A spacer device adapted to be mounted on a shopping cart in order to prevent lateral binding when said shopping cart is nested with another said shopping cart wherein said shopping carts define a mated pair when in a nested state so that there is an inner cart and an outer cart, each of said shopping carts including a basket operative to receive goods for transport and a wheeled frame supporting said basket for movement along a support surface, said mated pair having frame portions that contact one another to position the inner and outer carts with respect to one another when in the nested state, said spacer device comprising:

a) a central body portion adapted to be secured alongside of said frame portion of a first one of said mated pair at a selected location so that said central body portion is interposed between said frame portion thereby preventing direct contact of said frame portions to one another, said central body portion having an exposed glide surface formed of a low friction material and oriented such that said frame portion of a second one of said mated pair slideably contacts the glide surface for lateral sliding movement therealong as said mated pair are moved into and out of the nested state; and b) mounting means for securing and retaining said central body portion at the selected location whereby said glide surface of the central body portion prevents lateral binding when said mated pair are moved into and out of the nested state.

2. A spacer device according to claim 1 wherein said mounting means is operative to secure said central body to said frame portion of said outer cart such that the glide surface faces and contacts said frame portion of said inner cart when in the nested state.

3. A spacer device according to claim 1 wherein the glide surface is substantially planar.

4. A spacer device according to claim 1 wherein said low friction material is acetal or nylon.

5. A spacer device according to claim 1 wherein said frame portions are circular in cross-section and wherein said mounting means is defined by at least one C-shaped clip constructed of a resilient material so that said clip may be snap fit onto a selected said frame portion.

6. A spacer device according to claim 1 wherein the frame of each of said shopping carts includes horizontal side rails and upright members respectively connected to said side rails and at an angle with respect thereto, said mounting means including a first clip means for engaging a selected one of said upright members and a second clip means for engaging a respective side rail.

7. A spacer device according to claim 6 wherein said first clip means is formed by a curved wing operative to resiliently receive a portion of said upright member therebetween and wherein said second clip means is formed by a pair of curved jaws operative to resiliently receive a portion of said side rail therebetween.

8. A spacer device according to claim 7 wherein said central body is configured as a dog-legged shaped plate having first and second end portions and wherein said curved wing projects outwardly from said first end portion and wherein said pair of curved jaws project outwardly from said second end portion on a common side of said plate so that said first and second clip means are offset from one another.

9. A spacer device according to claim 8 wherein said central body, said curved wing and said curved jaws are formed of an integral piece of molded plastic material.

10. In a shopping cart including a basket operative to receive goods for transport and a wheeled frame supporting said basket wherein a plurality of shopping carts are adapted to nest with one another so that adjacent ones of said shopping carts define a mated pair including an inner cart and an outer cart with said mated pair having frame portions that contact one another to position the inner and outer carts with respect to one another when in a nested state, the improvement comprising a spacer device interposed between said frame portions and operative to prevent direct lateral contact thereof, said spacer device including a central body having a glide surface formed thereon and mounting means for securing said central body to the frame portion of a first one of said mated pair so that the frame portion of a second one of said mated pair laterally contacts the glide surface of said central body thereby reducing lateral binding of said frame portions when in the nested state.

11. The improvement according to claim 10 wherein said frame portions are constructed of tubular members, said mounting means comprising at least two clip structure operative to engage selected ones of said tubular members whereby said central body is secured against both dislodgment and movement relative to said frame portions.

12. The improvement according to claim 10 wherein the glide surface is planar.

13. The improvement according to claim 10 wherein said central body and said mounting means forming said spacer device are constructed as an integral piece of molded plastic material.

14. A shopping cart assembly adapted to be used to transport goods during a shopping excursion and configured so that a plurality of said shopping carts may be nested together for storage when not in use such that adjacent ones of said plurality form a mated pair of shopping carts defined by an inner cart and an outer cart nested together in a nested state, each said shopping cart comprising:
(a) a basket having a forward nose, a hinged back section and a rearward handlebar and adapted to receive goods for transport, said basket having sides that are forwardly convergent with respect to one another;
(b) a wheeled framework including left and right side rails that are forwardly convergent with respect one another and left and right upright support members extending upwardly from said left and right side rails and operative to support said basket; and
(c) left and right spacer devices respectively associated with said left and right side rails, each said spacer device including a central body portion having a glide surface formed thereon and mounting means for securing said central body portion laterally along said wheeled framework, said left and right space devices being located such that, when a mated pair of shopping carts are in nested state with said left side rails of the inner and outer carts alongside one another and with said right side rails of the inner and outer carts alongside one another, said central body portion of the left space device is laterally disposed between said left side rails and said central body portion of the right spacer device is laterally disposed between said right side rails, whereby one of said left side rails slideably contacts the glide surface of said left spacer device for sliding movement and one of said right side rails slideably contacts the glide surface of said right spacer device for sliding movement when said inner and outer carts are moved into and out of the nested state.

15. A shopping cart assembly according to claim 14 wherein said left and right spacer devices are each an elongated strip fastened to a respective left and right side rail.

16. A shopping cart assembly according to claim 14 wherein said left and right spacer devices are mounted to the framework of said outer cart with the respective glide surfaces facing inwardly toward one another.

17. A shopping cart assembly according to claim 14 wherein said left and right spacer devices are mounted to the framework of said inner cart with the respective guide surfaces facing outwardly away from one another.

18. A spacer device adapted to be mounted on a shopping cart in order to prevent binding when said shopping cart is nested with another said shopping cart wherein said shopping carts define a mated pair when in a nested state so that there is an inner cart and an outer cart, each of said shopping carts including a basket operative to receive goods for transport and a wheeled frame portion supporting said basket for movement along a support surface, said frame portion including side rails and upright members respectively connected to said side rails at an angle with respect thereto, said mated pair having fame portions that contact one another to position the inner and outer carts with respect to on another when in the nested state, said spacer device comprising:
a) a central body portion adapted to be secured alongside of said frame portion of a first one of said mated pair at a selected location so that said central body portion is interposed between said frame portions thereby preventing direct contact of said frame portions to one another, said central body portion having an exposed glide surface formed of a low friction material and oriented such that said frame portion of a second one of said mated pair slideably contacts the glide surface for sliding movement therealong as said mated pair are moved into and out of the nested state; and
b) mounting means including a first clip means for engaging a selected one of said upright members and a second clip means for engaging a respective side rail for securing and retaining said central body portion at the selected location.

* * * * *